(12) United States Patent
Wang et al.

(10) Patent No.: US 11,774,593 B2
(45) Date of Patent: Oct. 3, 2023

(54) METHOD OF SIMULTANEOUS LOCALIZATION AND MAPPING

(71) Applicant: Automotive Research & Testing Center, Lugong (TW)

(72) Inventors: Yu-Fang Wang, Lugong (TW); Yi-Shueh Tsai, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 485 days.

(21) Appl. No.: 16/728,868

(22) Filed: Dec. 27, 2019

(65) Prior Publication Data

US 2021/0199805 A1    Jul. 1, 2021

(51) Int. Cl.
*G01S 17/00* (2020.01)
*G01S 17/89* (2020.01)
*G01C 21/32* (2006.01)
*G06T 7/70* (2017.01)
*G06T 7/20* (2017.01)

(52) U.S. Cl.
CPC .............. *G01S 17/89* (2013.01); *G01C 21/32* (2013.01); *G06T 7/20* (2013.01); *G06T 7/70* (2017.01); *G06T 2207/10028* (2013.01); *G06T 2207/30252* (2013.01)

(58) Field of Classification Search
CPC ... G01S 17/89; G06T 7/70; G06T 7/20; G06T 2207/10028; G06T 2207/30252; G01C 21/32

USPC ......................................................... 701/514
See application file for complete search history.

(56) References Cited

U.S. PATENT DOCUMENTS

| | | | |
|---|---|---|---|
| 2011/0175984 A1* | 7/2011 | Tolstaya | G06T 7/194 348/222.1 |
| 2017/0161546 A1 | 6/2017 | Cansizoglu et al. | |
| 2018/0075643 A1* | 3/2018 | Sequeira | G05D 1/0274 |
| 2019/0050668 A1* | 2/2019 | Cansizoglu | G06K 9/6215 |
| 2019/0179021 A1* | 6/2019 | Wang | G06V 10/82 |
| 2019/0213743 A1* | 7/2019 | O'Connor | G06T 19/20 |
| 2019/0323843 A1* | 10/2019 | Yu | G06T 7/73 |

FOREIGN PATENT DOCUMENTS

| | | |
|---|---|---|
| CN | 105015419 B | 9/2017 |
| TW | 201825037 A | 7/2018 |

* cited by examiner

*Primary Examiner* — Tyler J Lee
*Assistant Examiner* — Tiffany P Ohman
(74) *Attorney, Agent, or Firm* — Birch, Stewart, Kolasch & Birch, LLP

(57) ABSTRACT

A method of simultaneous localization and mapping (SLAM) is provided to position a target object. Each of detected tracked objects in a surrounding environment of the target object is classified into a moving object or a static object based on data detected at different time points. The target object is then positioned without considering any of the tracked objects that are classified into a moving object.

6 Claims, 6 Drawing Sheets

Acquire a translation correction matrix and a rotation correction matrix for each of second to $N^{th}$ time points for previous/latest point cloud data — 211

Correct the previous/latest point cloud data based on corresponding translation correction matrices and rotation correction matrices acquired in sub-step 211 — 212

METHOD OF SIMULTANEOUS LOCALIZATION AND MAPPING

FIELD

The disclosure relates to a method of simultaneous localization and mapping (SLAM), and more particularly to a SLAM method based on object tracking.

BACKGROUND

Nowadays, the global positioning system (GPS) is commonly used for vehicle navigation, but its precision may degrade, for example, in a place with many objects that may obstruct transmission of signals from satellites, or on a cloudy day, etc. Accordingly, simultaneous localization and mapping (SLAM), which is a positioning technique that uses ambient features (e.g., surrounding objects) to perform positioning and that has been widely applied to robotic vacuum cleaners, is an alternative approach to vehicle navigation.

Conventional SLAM techniques use a sensor, such as an optical lens, a lidar, a color camera, a three-dimensional (3D) camera, etc., to detect a surrounding environment, construct or update a map that records therein ambient features thus detected (e.g., objects in the surrounding environment), and position a to-be positioned object in the map based on the ambient features. However, movable or moving objects in the surrounding environment impose uncertainty in terms of location thereof, which may result in misjudgments or noises during construction of the map, thereby adversely affecting precision of the positioning.

SUMMARY

Therefore, an object of the disclosure is to provide a method of SLAM, which may provide a higher precision in positioning.

According to the disclosure, the method is adapted to position a target object, and is to be implemented by a positioning system. The method includes: A) continuously detecting a surrounding environment of the target object, acquiring a first detection information piece that includes information of the surrounding environment related to a latest detection time point and a previous detection time point, and acquiring a second detection information piece related to information of the surrounding environment, wherein the previous detection time point is prior to the latest detection time point by a predetermined interval, and the positioning system is mounted to the target object; B) sorting out a plurality of ambient objects that correspond to the latest detection time point in the surrounding environment based on the first detection information piece; C) screening out a plurality of tracked objects that correspond to the latest detection time point from the plurality of ambient objects that correspond to the latest detection time point; D) for each of the plurality of tracked objects, classifying the tracked object into one of a moving object and a static object based on the first detection information piece that indicates information of the tracked object at the latest detection time point and information of the tracked object at the previous detection time point; E) filtering out information related to those of the plurality of tracked objects that are classified into a moving object from the second detection information piece, and obtaining a filtered second detection information piece; and F) positioning the target object based on a SLAM algorithm and the filtered second detection information piece.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
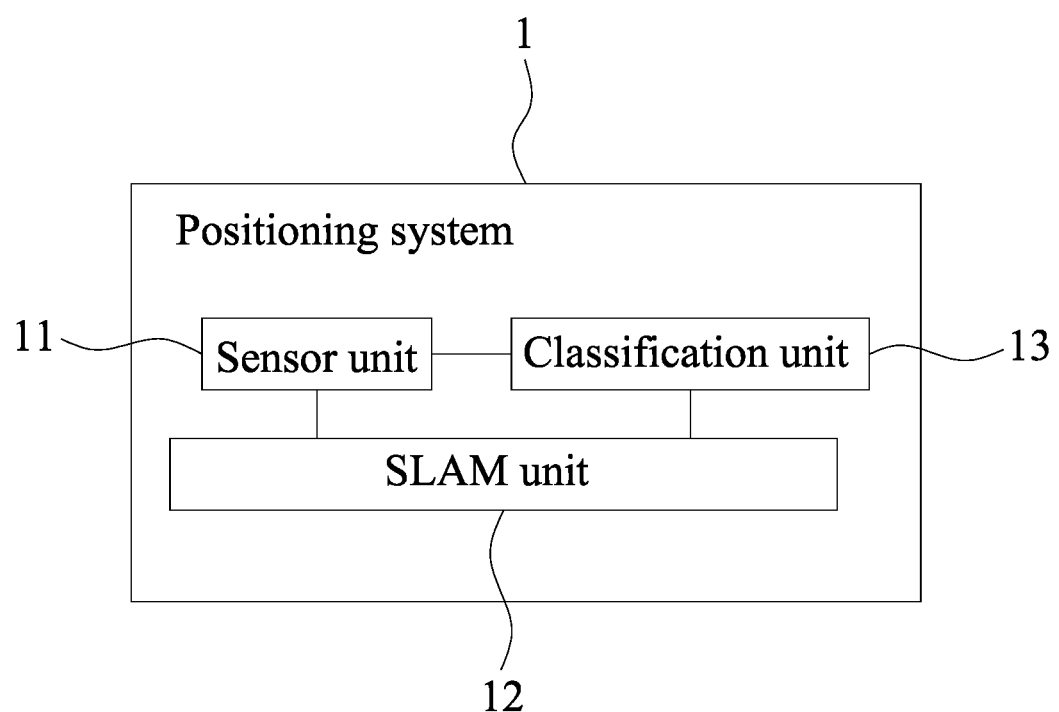
FIG. 1 is a block diagram illustrating a positioning system to implement a first embodiment of a method of SLAM according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 exemplarily shows a positioning system 1 to implement a first embodiment of a method of SLAM adapted to position a target object (not shown) according to this disclosure. The positioning system 1 is mounted to the target object, and includes a sensor unit 11, a SLAM unit 12, and a classification unit 13. In the first embodiment, the target object is a self-driving vehicle, but this disclosure is not limited in this respect.

The sensor unit 11 is configured to continuously detect a surrounding environment of the target object, and to acquire a first detection information piece that includes information of the surrounding environment related to a latest detection time point and a previous detection time point, and a second detection information piece related to information of the surrounding environment. The previous detection time point is prior to the latest detection time point by a predetermined interval. In the first embodiment, the first detection information piece is identical to the second detection information piece, while the first detection information piece is provided to the classification unit 13 and the second detection information piece is provided to the SLAM unit 12. In practice, the sensor unit 11 may be a lidar module or a 3D camera module. In the first embodiment, the sensor unit 11 is exemplified as the lidar module, and the first detection information piece generated thereby includes latest point cloud data of the surrounding environment related to the latest detection time point, and previous point cloud data of the surrounding environment related to the previous detection time point. Each of the previous point cloud data and the latest point cloud data includes a plurality of point cloud data pieces that are acquired at different time points within the predetermined interval counting from the corresponding one of the previous detection time point and the latest detection time point. It is noted herein that the plurality of point cloud data pieces of the previous point cloud data are all said to relate or correspond to the previous detection time point, whilst they are in fact acquired at different time points within the predetermined interval counting from the previous detection time point; likewise, the plurality of point cloud data pieces of the latest point cloud data are all said to relate or correspond to the latest detection time point, whilst they are in fact acquired at different time points within the predetermined interval counting from the latest detection time point. Each of the plurality of point cloud data pieces is composed of a plurality of data points corresponding to one or more objects in the surrounding environment. In the first embodiment, one of the plurality of point cloud data pieces that is acquired the first for the previous point cloud data (referred to as the first point cloud data piece of the previous point cloud data hereinafter) is acquired at the previous detection time point, and one of the plurality of point cloud data pieces that is acquired the first for the latest point cloud data (referred to as the first point cloud data piece of the latest point cloud data hereinafter) is acquired at the latest detection time point.

The SLAM unit 12 is configured to use the second detection information piece and a conventional SLAM algorithm (e.g., normal distribution transform (NDT), lidar odometry and mapping (LOAM), etc.) to construct a map that is related to the surrounding environment, and to position the target object. In one embodiment, the SLAM unit 12 may be implemented as a processor that is electrically coupled to the sensor unit 11 for receiving the second detection information piece, and that executes a SLAM program to realize the abovementioned functions.

The classification unit 13 is configured to identify a plurality of tracked objects in the surrounding environment based on the first detection information piece, and to classify each of the plurality of tracked objects into a moving object or a static object. In one embodiment, the classification unit 13 may be implemented as a processor that is electrically coupled to the sensor unit 11 for receiving the first detection information piece, that is electrically coupled to the SLAM unit 12 for providing classification results thereto, and that executes a program of object tracking and object classification to realize the abovementioned functions. In one embodiment, the SLAM unit 12 and the classification unit 13 may be integrated together using a single processor that is electrically coupled to the sensor unit 11 for receiving the first and second detection information pieces therefrom, and that executes the SLAM program and the program of object tracking and object classification.

Figure 2:
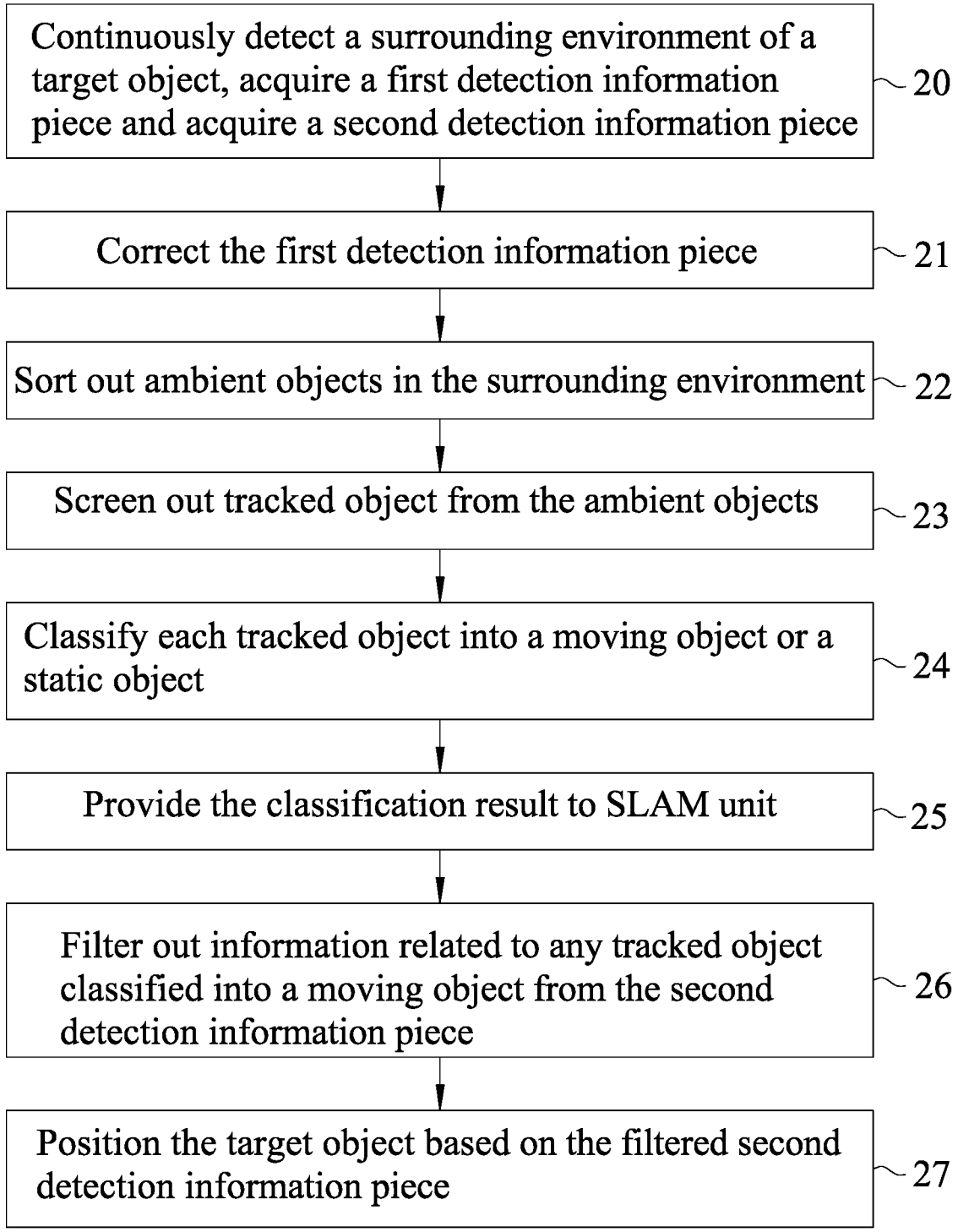
FIG. 2 is a flow chart illustrating steps of the first embodiment.

Referring to FIGS. 1 and 2, in step 20, the sensor unit 11 continuously detects/scans the surrounding environment of the target object, and acquires the first detection information piece that includes information of the surrounding environment related to the latest detection time point and the previous detection time point, and the second detection information piece related to information of the surrounding environment. In the firsts embodiment, the sensor unit 11 is exemplified as the lidar module, and the second detection information piece is identical to the first detection information piece, which includes latest point cloud data of the surrounding environment related to the latest detection time point, and previous point cloud data of the surrounding environment related to the previous detection time point. Each of the previous point cloud data and the latest point cloud data includes the plurality of point cloud data pieces that are acquired at different time points.

In step 21, for each of the previous point cloud data and the latest point cloud data, the classification unit 13 corrects each of the plurality of point cloud data pieces thereof other than the first point cloud data piece thereof based on a location and a heading (i.e., a direction toward which the target object is moving) of the target object at the corresponding one of the different time points, so as to acquire, as a result, corresponding one of corrected previous point cloud data and corrected latest point cloud data. The corrected previous point cloud data includes a first one of the plurality of point cloud data pieces of the previous point cloud data, and those of the plurality of point cloud data pieces of the previous point cloud data that have been corrected. The corrected latest point cloud data includes the first one of the plurality of point cloud data pieces of the latest point cloud data, and those of plurality of the point cloud data pieces of the latest point cloud data that have been corrected. Hereinafter, it is assumed that each of the previous point cloud data and the latest point cloud data includes first to $N^{th}$ point cloud data pieces that are acquired in the given order respectively at first to $N^{th}$ time points within the corresponding predetermined interval. Therefore, in step 21, the classification unit 13 corrects the second to $N^{th}$ point cloud data pieces for the previous point cloud data, so as to obtain the corrected previous point cloud data, which includes the original first point cloud data piece of the previous point cloud data and the corrected second to $N^{th}$ point cloud data pieces corresponding to the previous point cloud data, and the classification unit 13 also corrects the second to $N^{th}$ point cloud data pieces for the latest point cloud data, so as to obtain the corrected latest point cloud data, which includes the original first point cloud data piece of the latest point cloud data and the corrected second to $N^{th}$ point cloud data pieces corresponding to the latest point cloud data. In the first embodiment, correction of the first point cloud data piece is not required because the first point cloud data piece is acquired exactly at the latest detection time point, but this disclosure is not limited in this respect. In a case that the target object is a self-driving vehicle, the location and the heading of the target object at every time point can be acquired using a conventional bicycle model in cooperation with a velocity signal and an angle of yaw that can be obtained from the self-driving vehicle.

Figure 3:
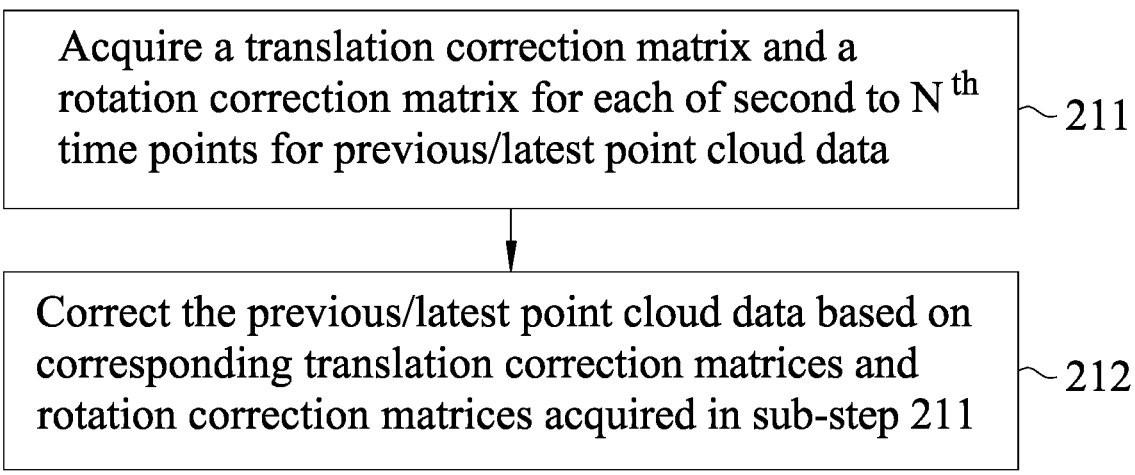
FIG. 3 is a flow chart illustrating step 21 of the first embodiment in detail.
Figure 4:
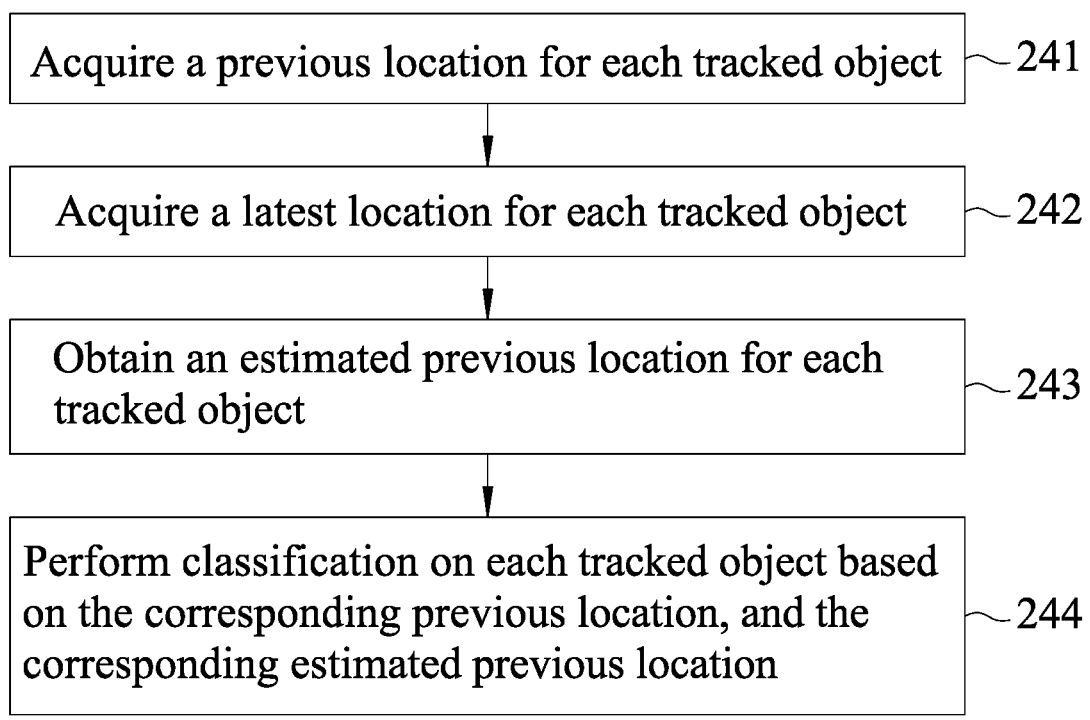
FIG. 4 is a flow chart illustrating step 24 of the first embodiment in detail.

Referring to FIGS. 1, 2 and 3, FIG. 3 illustrates sub-steps 211 and 212 of step 21. In sub-step 211, for each of the previous point cloud data and the latest point cloud data, the classification unit 13 acquires (N−1) number of first translation correction matrices and (N−1) number of first rotation correction matrices for the second to $N^{th}$ time points based on the locations and the headings of the target object at the first to $N^{th}$ time points, wherein for each of the second to $N^{th}$ time points, there is a corresponding one of the first translation correction matrix and a corresponding one of the first rotation correction matrix. The classification unit 13 calculates a displacement of the target object (i.e., the displacement of the sensor unit 11 that is mounted on the target object) from an $(i-1)^{th}$ time point to an $i^{th}$ time point based on the locations of the target object at the $(i-1)^{th}$ and $i^{th}$ time points, so as to obtain the first translation correction matrix corresponding to the $i^{th}$ time point, where i is a positive integer greater than one. Accordingly, the first translation correction matrices that correspond to the second to $N^{th}$ time points are obtained. The classification unit 13 calculates an angle of yaw of the target object (i.e., the angle of yaw of the sensor unit 11 that is mounted on the target object) from the $(i-1)^{th}$ time point to the $i^{th}$ time point based on the headings of the target object at the $(i-1)^{th}$ and $i^{th}$ time points, so as to obtain the first rotation correction matrix corresponding to the $i^{th}$ time point. Accordingly, the first rotation correction matrices that correspond to the second to $N^{th}$ time points are obtained.

In sub-step 212, for each of the previous point cloud data and the latest point cloud data, the classification unit 13 corrects the second to $N^{th}$ point cloud data pieces based on the corresponding first translation correction matrices and the corresponding first rotation correction matrices obtained therefor in sub-step 211, so as to, as a consequence, acquire the corrected previous point cloud data and the corrected latest point cloud data. In the first embodiment, for each of the previous point cloud data and the latest point cloud data, the classification unit 13 corrects, for each of the second to $N^{th}$ point cloud data pieces, the point cloud data piece based on the first translation correction matrix and the first rotation correction matrix that corresponds to the corresponding one of the second to $N^{th}$ time points, so as to acquire the corrected second to $N^{th}$ point cloud data pieces which cooperate with the first point cloud data piece of the previous/latest point cloud data to form the corresponding one of the corrected previous point cloud data and the corrected latest point cloud data.

When the target object moves, the displacement of the target object between two adjacent time points may result in mismatch of the corresponding point cloud data pieces that may relate to the same detection time point but are acquired at the adjacent time points, so step 21 may be required to mitigate the mismatch. However, if the target object moves slow enough, the mismatch may be ignored. Accordingly, in one embodiment, a predetermined speed may be defined such that step 21 is only required when a moving speed of the target object is greater than the predetermined speed, and is omitted when the moving speed of the target object is not greater than the predetermined speed.

Referring to FIGS. 1 and 2, in step 22, the classification unit 13 sorts out a plurality of ambient objects that correspond to the latest detection time point in the surrounding environment based on the first detection information piece. In detail, the classification unit 13 groups the plurality of data points in the corrected previous point cloud data into a plurality of first point cloud groups, and marks the plurality of first point cloud groups as a plurality of first ambient objects, respectively; and the classification unit 13 also groups the plurality of data points in the corrected latest point cloud data into a plurality of second point cloud groups, and marks the plurality of second point cloud groups as a plurality of second ambient objects, respectively. The techniques of grouping should be well known to one having ordinary skill in the art, and details thereof are omitted herein for the sake of brevity. For example, the grouping may be performed based on vertical and horizontal distances among the plurality of data points of the point cloud data, and this disclosure is not limited in this respect.

In step 23, the classification unit 13 screens out the plurality of tracked objects that correspond to the latest detection time point from the plurality of ambient objects. In one embodiment, the classification unit 13 screens out those of the plurality of ambient objects of which a size falls within a predetermined size range to serve as the plurality of tracked objects.

In step 24, for each of the plurality of tracked objects, the classification unit 13 classifies the plurality of tracked object into one of a moving object and a static object based on the first detection information piece that indicates information of the tracked object at the latest detection time point and information of the tracked object at the previous detection time point.

Referring to FIGS. 1, 2, 3 and 4, FIG. 4 illustrates sub-steps 241, 242, 243 and 244 of step 24. In sub-step 241, for each of the plurality of tracked objects, the classification unit 13 acquires a previous location related to the previous detection time point based on one of the first point cloud groups that corresponds to the tracked object.

In sub-step 242, for each of the plurality of tracked objects, the classification unit 13 acquires a latest location related to the latest detection time point based on one of the second point cloud groups that corresponds to the tracked object.

In sub-step 243, for each of the plurality of tracked objects, the classification unit 13 obtains an estimated previous location related to the previous detection time point through estimation based on a location and a heading of the target object corresponding to the latest detection time point, a location and a heading of the target object corresponding to the previous detection time point, and the latest location of the tracked object acquired in sub-step 242. As mentioned previously, the location and the heading of the target object at the previous detection time point and those at the latest detection time point can be acquired using the conventional bicycle model in cooperation with the velocity signal and the angle of yaw that can be obtained from the target object (e.g., the self-driving vehicle). In detail, the classification unit 13 calculates the displacement of the target object from the previous detection time point to the latest detection time point based on the locations of the target object at the previous detection time point and the latest detection time point, so as to obtain a second translation correction matrix corresponding to the latest detection time point. The classification unit 13 also calculates the angle of yaw of the target object from the previous detection time point to the latest detection time point based on the headings of the target object at the previous detection time point and the latest detection time point, so as to obtain a second rotation correction matrix corresponding to the latest detection time point. Then, the classification unit 13 calculates the estimated previous location based on the latest location, the second translation correction matrix, and the second rotation correction matrix.

In sub-step 244, the classification unit 13 performs classification on each of the plurality of tracked objects based on the previous location obtained in sub-step 241 for the tracked object, and the estimated previous location obtained in sub-step 243 for the tracked object. In detail, for each of the plurality of tracked objects, the classification unit 13 classifies the tracked object into a moving object when a difference between the previous location and the estimated previous location of the tracked object is greater than a predetermined distance threshold, and classifies the tracked object into a static object when otherwise.

Referring to FIGS. 1 and 2 again, in step 25, the classification unit 13 provides a classification result that is obtained in step 24 to the SLAM unit 12. The classification result indicates those of the plurality of tracked objects that are classified into a moving object. In one embodiment, each of the plurality of tracked objects indicated in the classification result may be represented by the corresponding second point cloud group. In one embodiment, each of the plurality of tracked objects indicated in the classification result may be represented by a coordinate set acquired from the corresponding second point cloud group (e.g., central coordinates of the corresponding second point cloud group).

In step 26, the SLAM unit 12 filters out information related to the plurality of tracked objects that are classified into a moving object from the second detection information piece, and the SLAM unit 12 obtains a filtered second detection information piece.

In step 27, the SLAM unit 12 uses a conventional SLAM algorithm to position the target object based on the filtered second detection information piece. Since the filtered second detection information piece does not include information related to those of the plurality of tracked objects that are classified into a moving object, misjudgment that may occur in matching features of the plurality of tracked objects due to the uncertainty of the moving objects in terms of location could be prevented, thereby enhancing precision of positioning.

Figure 5:
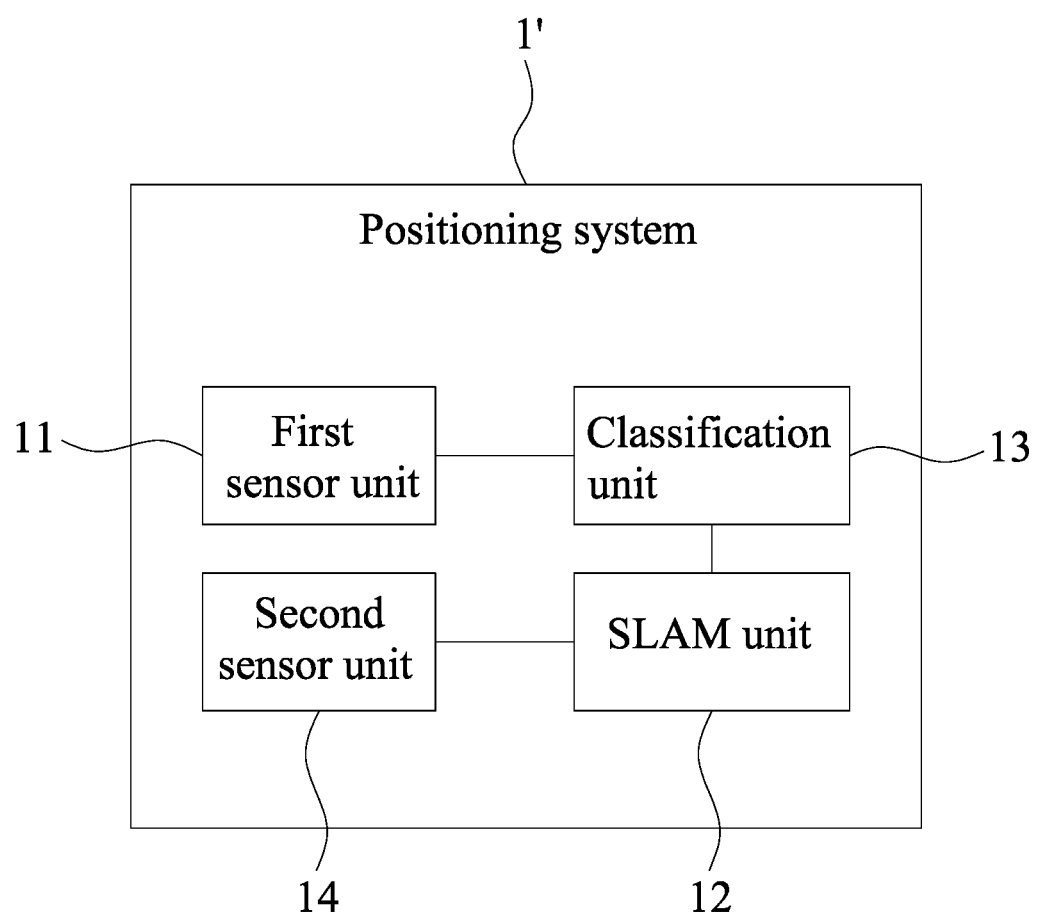
FIG. 5 is a block diagram illustrating a positioning system to implement a second embodiment of a method of SLAM according to the disclosure.

FIG. 5 exemplarily shows a positioning system 1' to implement a second embodiment of the method of SLAM adapted to position the target object (not shown) according to this disclosure. The positioning system 1' differs from the positioning system 1 (shown in FIG. 1) in the following aspects. The positioning system 1' further includes a first sensor unit 11 (the sensor unit 11 in FIG. 1 is referred to as the first sensor unit 11 in FIG. 5) and a second sensor unit 14 which is electrically coupled to the SLAM unit 12 and is configured to continuously detect the surrounding environment of the target object. The second detection information piece is acquired by the second sensor unit 14, and is related to information of the surrounding environment and provided to the SLAM unit 12. In the second embodiment, the second sensor unit 14 is exemplified as a 3D camera module and used to capture images of the surrounding environment of the target object, and the captured images serve as the second detection information piece. The second sensor unit 14 is synchronized with the first sensor unit 11, and therefore, when the first sensor unit 11 acquires the first detection information piece, the second sensor unit 14 acquires the second detection information piece at the same time.

Figure 6:
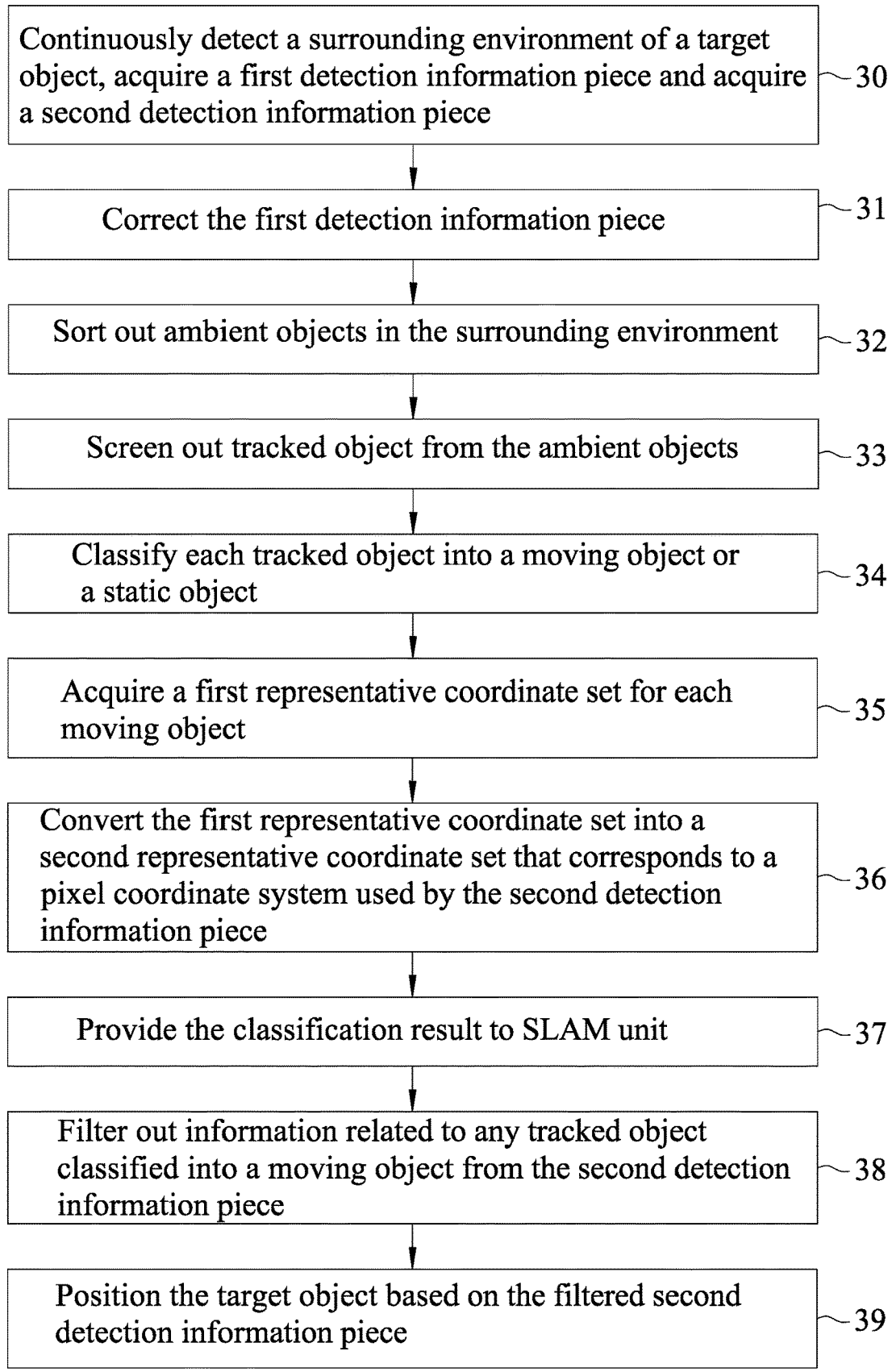
FIG. 6 is a flow chart illustrating steps of the second embodiment.

Further referring to FIGS. 5 and 6, the second embodiment includes steps 30 to 39. Steps 30 to 34 are respectively the same as steps 20 to 24 shown in FIG. 2, and steps 37 to 39 are respectively the same as steps 25 to 27 shown in FIG. 2. The second embodiment further includes steps 35 and 36 for data conversion of the classification result since the second detection information piece is different from the first detection information piece.

In step 35, for each of those of the plurality of tracked objects that are classified into a moving object, the classification unit 13 acquires a first representative coordinate set (e.g., central coordinates of the corresponding second point cloud group) based on one of the second point cloud groups that corresponds to the tracked object.

In step 36, for each of those of the plurality of tracked objects that are classified into a moving object, the classification unit 13 converts the first representative coordinate set into a second representative coordinate set that corresponds to a pixel coordinate system based on a set of parameters for coordinate conversion. The set of parameters are related to conversion of coordinates from a point cloud coordinate system which is used by the first detection information piece to the pixel coordinate system. The pixel coordinate system is used by the second detection information piece. In one embodiment, the set of parameters for coordinate conversion include an extrinsic parameter matrix and an intrinsic parameter matrix. The extrinsic parameter matrix can be obtained according to:

$$\begin{bmatrix} X' \\ Y' \\ Z' \end{bmatrix} = R_{roll} \times R_{pitch} \times R_{yaw} \begin{bmatrix} X \\ Y \\ Z \end{bmatrix} + \begin{bmatrix} \Delta X \\ \Delta Y \\ \Delta Z \end{bmatrix} \quad (1)$$

where $$\begin{bmatrix} X \\ Y \\ Z \end{bmatrix}$$

represents a location of the first sensor unit 11, $$\begin{bmatrix} X' \\ Y' \\ Z' \end{bmatrix}$$

represents a location of the second sensor unit 14, $R_{roll} \times R_{pitch} \times R_{yaw}$ represents a three-dimensional rotation matrix, and $$\begin{bmatrix} \Delta X \\ \Delta Y \\ \Delta Z \end{bmatrix}$$

represents a translation matrix. The three-dimensional rotation matrix and the translation matrix cooperatively form the extrinsic parameter matrix. The intrinsic parameter matrix can be obtained based on a focal length of the second sensor unit 14, and central coordinates of the captured images acquired by the second sensor unit 14. The acquisition and use of the extrinsic parameter matrix and the intrinsic parameter matrix are well known to ordinarily skilled in the art, so details thereof are omitted herein for the sake of brevity.

Furthermore, the classification result sent to the SLAM unit 12 in step 37 includes the second representative coordinate set(s) for the "moving" tracked object(s). In step 38, the information related to the "moving" tracked object(s) is filtered out from the second detection information piece based on the second representative coordinate set(s) thus acquired.

In summary, the embodiments of the method of SLAM classify each of the plurality of tracked objects into a moving object or a static object, and perform positioning on the target object by casting aside those of the plurality of tracked objects which are each classified into a moving object. That is, the method of SLAM can eliminate uncertainty imposed by moving objects, which may result in mismatching of the plurality of tracked objects at different detection time points, and the precision of positioning is thus promoted.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of simultaneous localization and mapping (SLAM), the method adapted to position a target object, to be implemented by a positioning system, and comprising:
   A) by a sensor unit of the positioning system, continuously detecting a surrounding environment of the target object, acquiring a first detection information piece that includes information of the surrounding environment related to a latest detection time point and a previous detection time point, and acquiring a second detection information piece related to information of the surrounding environment, wherein the previous detection time point is prior to the latest detection time point by a predetermined interval, and the positioning system is mounted to the target object;
   B) by a processor of the positioning system, sorting out a plurality of ambient objects that correspond to the latest detection time point in the surrounding environment based on the first detection information piece;
   C) by the processor of the positioning system, screening out a plurality of tracked objects that correspond to the latest detection time point from the plurality of ambient objects;
   D) by the processor of the positioning system, for each of the plurality of tracked objects, classifying the tracked object into one of a moving object and a static object based on the first detection information piece that indicates information of the tracked object at the latest detection time point and information of the tracked object at the previous detection time point;
   E) by the processor of the positioning system, filtering out information related to those of the plurality of tracked objects that are classified into a moving object from the second detection information piece, and obtaining a filtered second detection information piece; and
   F) by the processor of the positioning system, positioning the target object based on a SLAM algorithm and the filtered second detection information piece;
   wherein the positioning system includes a lidar module that is used to continuously detect the surrounding environment of the target object and to acquire the first detection information piece, the first detection information piece including latest point cloud data of the surrounding environment related to the latest detection time point, and previous point cloud data of the surrounding environment related to the previous detection time point, each of the latest and previous point cloud data being composed of a plurality of data points;
   wherein step B) includes: grouping the plurality of data points in the previous point cloud data into a plurality of first point cloud groups, and marking the plurality of first point cloud groups as a plurality of first ambient objects, respectively; and grouping the plurality of data points in the latest point cloud data into a plurality of second point cloud groups, and marking the second point cloud groups as a plurality of second ambient objects, respectively;
   wherein each of the previous point cloud data and the latest point cloud data includes a plurality of point cloud data pieces that are acquired at different time points, the method of SLAM further comprising, before step B):
   G) for each of the previous point cloud data and the latest point cloud data, other than a first one of the plurality of point cloud data pieces that is acquired at the corresponding one of the latest detection time point and the previous detection time point, correcting each of the plurality of point cloud data pieces based on a location and a heading of the target object at the corresponding one of the different time points, so as to, as a result, acquire a corresponding one of corrected previous point cloud data and corrected latest point cloud data;
   wherein the corrected previous point cloud data serves as the previous point cloud data in step B), and includes the first one of the plurality of point cloud data pieces of the previous point cloud data, and those of the plurality of point cloud data pieces of the previous point cloud data that have been corrected in step G); and
   wherein the corrected latest point cloud data serves as the latest point cloud data in step B), and includes the first one of the plurality of point cloud data pieces of the latest point cloud data, and those of the plurality of point cloud data pieces of the latest point cloud data that have been corrected in step G).

2. The method of SLAM of claim 1, wherein in step E), the second detection information piece is identical to the latest point cloud data, and step E) includes filtering out those of the second point cloud groups that are classified into a moving object from the second detection information piece.

3. The method of SLAM of claim 1, wherein step D) includes:
   D-1) for each of the plurality of tracked objects, acquiring a previous location related to the previous detection time point based on one of the first point cloud groups that corresponds to the tracked object;
   D-2) for each of the plurality of tracked objects, acquiring a latest location related to the latest detection time point based on one of the second point cloud groups that corresponds to the tracked object;
   D-3) for each of the plurality of tracked objects, obtaining an estimated previous location related to the previous detection time point through estimation based on a location and a heading of the target object corresponding to the latest detection time point, a location and a heading of the target object corresponding to the previous detection time point, and the latest location of the tracked object acquired in sub-step D-2); and
   D-4) for each of the plurality of tracked objects, classifying the tracked object into a moving object when a difference between the previous location and the estimated previous location of the tracked object is greater than a predetermined distance threshold, and classifying the tracked object into a static object when otherwise.

4. The method of SLAM of claim 1, wherein the positioning system further includes a camera module that is used to capture images of the surrounding environment of the target object and to acquire the second detection information piece, the method of SLAM further comprising, before step E):
   H) for each of those of the plurality of tracked objects that are classified into a moving object, acquiring a first representative coordinate set based on one of the second point cloud groups that corresponds to the tracked object; and I) for each of those of the plurality of tracked objects that is classified into a moving object, converting the first representative coordinate set into a second representative coordinate set that corresponds to a pixel coordinate system based on a set of parameters for coordinate conversion, wherein the set of parameters are related to conversion of coordinates from a point cloud coordinate system that is used by the first detection information piece to the pixel coordinate system that is used by the second detection information piece; and wherein, in step (E), the information related to those of the plurality of tracked objects that are classified into a moving object is filtered out from the second detection information piece based on the second representative coordinate set acquired for each of those of the plurality of tracked objects that are classified into a moving object.

5. The method of SLAM of claim 1, wherein, in step C), the plurality of tracked objects that correspond to the latest detection time point are those of the plurality of ambient objects which have a size falling within a predetermined size range.

6. The method of SLAM of claim 1, wherein the target object is a vehicle, and in step (F), positioning the target object is performed for vehicle navigation.

* * * * *